US00H002086H

(19) United States

(12) Statutory Invention Registration (10) Reg. No.: US H2086 H

Amsler (43) Published: Oct. 7, 2003

(54) FINE PARTICLE LIQUID FILTRATION MEDIA

(75) Inventor: Nicole Michele Amsler, Cartersville, GA (US)

(73) Assignee: Kimberly-Clark Worldwide, Neenah, WI (US)

(21) Appl. No.: 09/358,125

(22) Filed: Jul. 20, 1999

Related U.S. Application Data

(60) Provisional application No. 60/098,526, filed on Aug. 31, 1998.

(51) Int. Cl.[7] ..... D04H 5/00; D04H 1/54; D04H 1/00

(52) U.S. Cl. ..... 442/327; 442/340; 442/346; 442/381; 442/409; 442/415

(58) Field of Search ..... 442/340, 344, 442/345, 346, 347, 350, 351, 352, 353, 356, 358, 381, 409, 415

(56) References Cited

U.S. PATENT DOCUMENTS

| | | | | |
|---|---|---|---|---|
| 4,041,203 A | | 8/1977 | Brock et al. | 428/157 |
| 4,047,534 A | | 9/1977 | Thomaschefsky et al. | 128/461 |
| 4,100,324 A | | 7/1978 | Anderson et al. | 428/288 |
| 4,118,531 A | * | 10/1978 | Hauser | 428/224 |
| 4,375,718 A | | 3/1983 | Wadsworth et al. | 29/592 |
| 4,436,780 A | | 3/1984 | Hotchkiss et al. | 428/198 |
| 4,795,668 A | | 1/1989 | Krueger et al. | 428/174 |
| 4,818,464 A | | 4/1989 | Lau | 264/510 |
| 4,824,451 A | | 4/1989 | Vogt et al. | 55/528 |
| 4,973,503 A | | 11/1990 | Hotchkiss | 428/36.4 |
| 5,213,881 A | | 5/1993 | Timmons et al. | 428/224 |
| 5,350,624 A | | 9/1994 | Georger et al. | 428/219 |
| 5,370,830 A | | 12/1994 | Jameson et al. | 264/23 |
| 5,409,768 A | | 4/1995 | Dickenson et al. | 428/283 |
| 5,418,045 A | | 5/1995 | Pike et al. | 428/198 |
| 5,464,688 A | | 11/1995 | Timmons et al. | 428/298 |
| 5,498,463 A | | 3/1996 | McDowall et al. | 428/198 |
| 5,533,991 A | | 7/1996 | Kirby et al. | 604/383 |
| 5,534,339 A | | 7/1996 | Stokes | 428/284 |
| 5,586,997 A | | 12/1996 | Pall et al. | 55/361 |
| 5,603,830 A | | 2/1997 | Everhart et al. | 210/502.1 |
| 5,645,057 A | * | 7/1997 | Watt et al. | 128/206.12 |
| 5,667,562 A | | 9/1997 | Midkiff | 96/15 |
| 5,705,251 A | | 1/1998 | Morman et al. | 428/114 |
| 5,709,735 A | | 1/1998 | Midkiff et al. | 96/17 |
| 5,721,180 A | | 2/1998 | Pike et al. | 442/346 |
| 5,736,473 A | | 4/1998 | Cohen et al. | 442/239 |
| 5,773,375 A | * | 6/1998 | Swan et al. | 442/340 |
| 5,873,968 A | | 2/1999 | Pike et al. | 156/73.2 |
| 5,877,099 A | * | 3/1999 | Cohen | 442/405 |
| 5,906,743 A | | 5/1999 | Cohen et al. | 210/502.1 |
| 6,037,282 A | * | 3/2000 | Milding et al. | 442/408 |

FOREIGN PATENT DOCUMENTS

| | | |
|---|---|---|
| WO | 95/13856 | 5/1995 |
| WO | 96/13319 | 5/1996 |
| WO | 96/37276 | 11/1996 |

* cited by examiner

*Primary Examiner*—Michael J. Carone
*Assistant Examiner*—Aileen B. Felton
(74) *Attorney, Agent, or Firm*—William W. Letson

(57) ABSTRACT

The present invention provides a filter media comprising (a) a nonwoven composite material comprising a stabilized mixture of thermoplastic microfibers and at least about 50%, by weight, of a secondary fibrous material such as pulp or polymeric staple fibers; (b) a first outer nonwoven web comprising a substantially uniform nonwoven web of autogenously bonded multicomponent fibers; and (c) a second outer nonwoven web wherein the nonwoven composite material is positioned between the first outer nonwoven web and second outer nonwoven web. The filter material is well suited to filtering liquid borne particulate matter ranging in size from $5\mu$ to about $25\mu$.

14 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FINE PARTICLE LIQUID FILTRATION MEDIA

This application claims priority from U.S. Provisional Application No. 60/098,526 filed on Aug. 31, 1998.

FIELD OF THE INVENTION

The present invention relates to nonwoven composite fabrics suitable for use for fine particle liquid filtration.

BACKGROUND OF THE INVENTION

Nonwoven fabrics have been used for a variety of filtration and filtration-like applications. As an example, fine fiber webs such as meltblown fabrics and laminates thereof have commonly been used within air filtration media. Meltblown fabrics comprise a web of randomly inter-laid fine fibers, which provide a structure having excellent barrier properties. Generally, as the average fiber diameter decreases there is a corresponding decrease in the average pore size of the fabric. Thus, fabrics with finer fibers or smaller diameter fibers typically have increased barrier properties when compared to like webs of relatively larger fiber size. Therefore, due to fine fibers achievable in meltblown fiber webs and the excellent barrier properties resulting therefrom, meltblown fiber webs have been used in a variety of air filtration media such as, for example, in HEPA filters as discussed in U.S. Pat. No. 4,824,451, bag filters as discussed in U.S. Pat. No. 5,586,997, and filtering bacteria from fluids as discussed in U.S. Pat. No. 5,582,907 to Paul.

However, the needs of air filtration media often vary considerably from those of liquid filtration media. Notably, the particle size distribution within a liquid stream is typically much larger than particles associated with an air stream. In this regard, air filtration media are often expected to collect particles having a size less than about 5$\mu$ whereas with fine particle liquid filtration the particle size often varies between about 5$\mu$to about 30$\mu$. Multilayer filtration media suitable for air filtration, such as that described above, will often have an unacceptably short filter life when used for liquid filtration. While having an excellent filtration efficiency, the particles sizes associated with liquid filtration are typically of a size and distribution that the meltblown webs and/or laminates thereof quickly become fully saturated and/or create high pressure drops.

Additionally, meltblown fiber nonwoven webs can be relatively weak fabrics and often cannot, by themselves, withstand the conditions experienced by liquid filtration media. Thus, meltblown webs have been supported in multilayer structures to provide filter media or filter-like articles with improved strength and/or durability. In this regard, meltblown fiber nonwoven webs have been laminated with spunbond fiber nonwoven webs in order to provide a material with a combination of good strength and barrier properties. As examples thereof, spunbond/meltblown/spunbond media have been used in sterilization wraps and other like media such as, for example, those described in U.S. Pat. No. 5,464,688 to Timmons et al. and U.S. Pat. No. 4,041,203 to Brock et al. However, many nonwoven laminates are point bonded to form an integrated structure and, in this regard, the point bonds undesirably increase pressure drop without a corresponding increase in filter life and/or efficiency. Additional spunbond fabrics and/or laminates thereof utilized in filtration media are described in PCT Publication Nos. WO 96/13319 and WO 95/13856. Further, composite meltblown nonwoven fabrics, such as those described in U.S. Pat. No. 4,100,324 to Anderson et al., have also been used in liquid filtration applications wherein the composite nonwoven fabric is supported by a spunbond carrier sheet and a felt material.

However, there exists a need for filtration media suitable for use in liquid filtration that has good filtration efficiency and yet which also exhibit a suitable or even extended filtration life. Further, there exists a need for such materials which can provide the desired filtration efficiency and filter life and which are capable of servicing high volumes without creating high pressure drops. Still further, there exists a need for such materials that can be economically produced and which can withstand the pressures, handling and other conditions commonly associated with liquid filtration.

SUMMARY OF THE INVENTION

The aforesaid needs are fulfilled and the problems experienced by those skilled in the art overcome by the filtration media of the present invention comprising (a) a nonwoven composite material having a first and second side and comprising a matrix of thermoplastic microfibers having within said matrix at least about 50%, by weight, of a secondary material; (b) a first nonwoven web proximate the first side of the nonwoven composite material and comprising a substantially uniform nonwoven web of bonded fibers; and (c) a second nonwoven web proximate the second side of the nonwoven composite material such that the nonwoven composite material is positioned between the first and second nonwoven web. Desirably the nonwoven composite material and the first and second nonwoven webs form an integrated, autogenously bonded laminate. The nonwoven composite material desirably has a basis weight between about 30 g/m$^2$ and about 300 g/m$^2$ and further the secondary material of the nonwoven composite material desirably comprises a fibrous material such as, for example, pulp or polymeric staple fibers. The substantially uniform nonwoven material desirably comprises a nonwoven web having inter-fiber bonds throughout the web such as, for example, an autogenously bonded web of crimped polyethylene/polypropylene bicomponent fibers having a density between about 0.01 g/cm$^3$ and about 0.2 g/cm$^3$.

In a further aspect of the invention, liquids containing particulate matter can be filtered by providing the filter media of the present invention, supporting the filter media on a foraminous surface, and then drawing the liquid through the filter media, wherein particulate matter is collected in the filter media as the liquid passes therethrough. The liquid to be filtered desirably contains a substantial amount of particulate matter having a particle size of from about 5$\mu$ to about 25$\mu$.

DEFINITIONS

Figure 1:
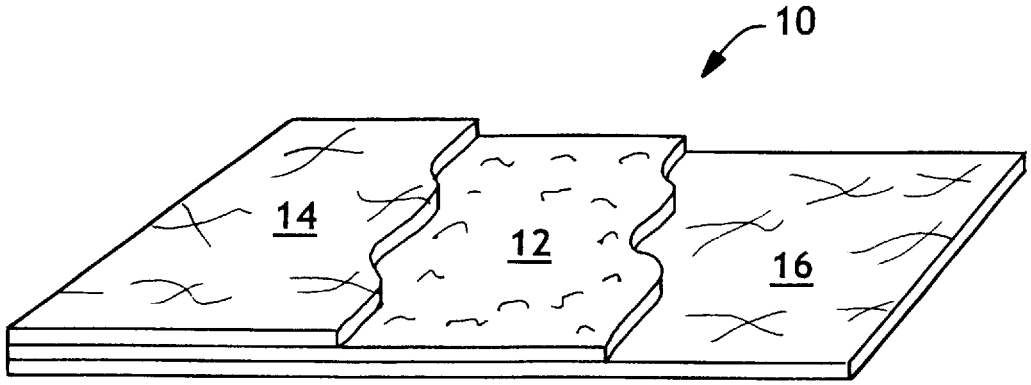
FIG. 1 is a partially elevated side view of a three layer material of the present invention shown partially broken away.

As used herein and in the claims, the term "comprising" is inclusive or open-ended and does not exclude additional unrecited elements, compositional components, or method steps.

As used herein the term "nonwoven fabric" or "nonwoven web" means a web having a structure of individual fibers or threads which are interlaid, but not in an identifiable manner as in a knitted fabric. Nonwoven fabrics or webs have been formed from many processes such as for example, meltblowing processes, spunbonding processes, air-laid and bonded-carded web processes.

As used herein the term "microfibers" or "fine fibers" means small diameter fibers having an average fiber size not greater than about 20 microns. As used herein "fiber size" refers to the diameter of round fibers or the mean diameter for non-round fibers.

As used herein the term "spunbonded fibers" or "spunbond fibers" refers to small diameter fibers of drawn or substantially oriented polymer. Generally, spunbond fibers are formed by extruding molten thermoplastic material as filaments from a plurality of fine, usually circular capillaries of a spinneret with the diameter of the extruded filaments then being rapidly reduced such as, for example, in U.S. Pat. No. 4,340,563 to Appel et al., U.S. Pat. No. 3,802,817 to Matsuki et al., U.S. Pat. No. 3,542,615 to Dobo et al. and U.S. Pat. No. 5,382,400 to Pike et al.; the entire contents of each of the aforesaid references are incorporated herein by reference. Spunbond fibers are generally not tacky when they are deposited onto a collecting surface and thus often require additional mechanical or chemical bonding to form an integrated stabilized web.

As used herein the term "meltblown fibers" means fibers which are generally formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are generally carried by the high velocity gas stream and are deposited on a collecting surface to form a web of randomly dispersed meltblown fibers. Such a process is disclosed, for example, in Naval Research Laboratory Report No. 4364, "Manufacture of Super-fine Organic Fibers" by V. A. Wendt, E. L. Boon, and C. D. Fluharty, Naval Research Laboratory Report No. 5265, "An Improved Device for the Formation of Super-fine Thermoplastic Fibers" by K. D. Lawrence, R. T. Lukas, and J. A. Young, U.S. Pat. No. 3,849,241 to Butin et al.; U.S. Pat. No. 3,849,241 to Butin et al. and U.S. Pat. No. 5,213,881 to Timmons et al.; the entire contents of the aforesaid references are incorporated herein by reference. Meltblown fibers are often microfibers which can be continuous or discontinuous and are generally tacky when deposited onto a collecting surface.

As used herein the term "polymer" generally includes but is not limited to, homopolymers, copolymers, such as for example, block, graft, random and alternating copolymers, terpolymers, etc. and blends and/or modifications thereof. Furthermore, unless otherwise specifically limited, the term "polymer" shall include all possible spatial configurations of the molecule. These configurations include, but are not limited to, isotactic, syndiotactic and/or random symmetries.

As used herein the term "monocomponent" fiber refers to a fiber formed a single, continuous polymer segment.

As used herein the term "multiconstituent fibers" refers to fibers that have been formed from at least two polymers extruded from the same extruder. Multiconstituent fibers do not have the various polymer components arranged in constantly positioned distinct zones across the cross-sectional area of the fiber and the various polymers are usually not continuous along the entire length of the fiber, instead usually forming fibrils or protofibrils which start and end at random. Biconstituent fibers are a specific class of multiconstituent fibers wherein the fiber comprises two distinct polymers.

As used herein the term "blend" means a mixture of two or more polymers while the term "alloy" means a sub-class of blends wherein the components are immiscible but have been compatibilized.

As used herein, "ultrasonic bonding" means a process performed, for example, by passing the fabric between a sonic horn and anvil roll as illustrated in U.S. Pat. 4,374,888 to Bornslaeger.

As used herein "point bonding" means bonding one or more layers of fabric at numerous small, discrete bond points. For example, thermal point bonding generally involves passing one or more layers to be bonded between heated rolls such as, for example an engraved patterned roll and a flat calender roll. The engraved roll is patterned in some way so that the entire fabric is not bonded over its entire surface, and the anvil roll is usually flat. As a result, various patterns for engraved rolls have been developed for functional as well as aesthetic reasons. One example of a pattern has points and is the Hansen Pennings or "H&P" pattern with about a 30% bond area and with about 200 bonds/square inch as taught in U.S. Pat. No. 3,855,046 to Hansen et al.

As used herein, the term "autogenous bonding" refers to bonding between discrete parts and/or surfaces independently of external mechanical fasteners or external additives such as adhesives, solders, and so forth. As an example, multicomponent fibers and multiconstituent fibers can be autogenously bonded by developing inter-fiber bonds at fiber contact points without destroying the fiber structure.

DESCRIPTION OF THE INVENTION

Figure 2:
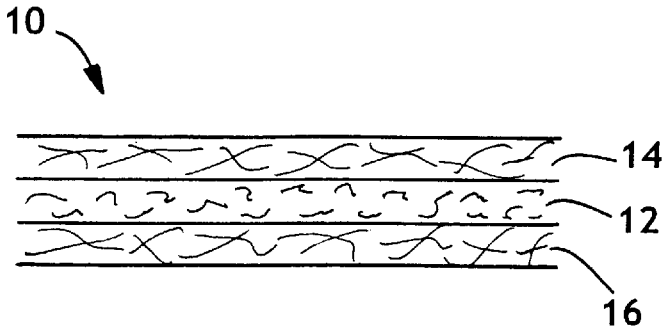
FIG. 2 is a side cross-sectional view of a three-layer material of the present invention.

In reference to FIGS. 1 and 2, multilayer filtration media 10 can comprise a nonwoven composite material 12, a first substantially uniform nonwoven fabric 14 and a second nonwoven fabric 16 such that nonwoven composite material 12 is disposed there between. The first substantially uniform nonwoven fabric 14 desirably comprises a low density and/or high-loft material and faces upstream of the composite material 12 such that larger particles are collected within first substantially uniform nonwoven fabric 14 prior to reaching nonwoven composite material 12.

Nonwoven composite materials suitable for use with the present invention include materials comprising a mixture or stabilized matrix of thermoplastic fibers and a distinct secondary particulate or fibrous material therein. As an example, suitable nonwoven composite materials may be made by a process in which at least one meltblown die head is arranged near a chute through which other materials are added to the web while it is forming. Suitable secondary materials include, but are not limited to, pulp, cellulose, feathers, polymeric staple fibers and/or other fibrous or particulate matter. Desirably, the composite material comprises a matrix of thermoplastic fibers and a second nonthermoplastic material. Composite materials made from such a process are often referred to as "coform" materials and examples of such processes are described in commonly assigned U.S. Pat. No. 4,818,464 to Lau, U.S. Pat. No. 4,100,324 to Anderson et al., and U.S. Pat. No. 5,350,624 to Georger et al., and U.S. patent application Ser. No. 08/882,308 to Strack et al. filed Jun. 25, 1997; the entire contents of the aforesaid patents and application are incorporated herein by reference. The composite material desirably comprises fine fibers having an average fiber diameter of less than about 20μ and even more desirably between about 0.5μ and about 15μ and still more desirably between about 1μ and about 10μ. Additionally, the fine fiber composite material desirably has a basis weight between about 30 g/m$^2$ to about 300 g/m$^2$ and even more desirably between about 50 g/m$^2$ to about 150 g/m$^2$.

The secondary material desirably comprises between about 50% by weight and about 85% by weight and still more desirably between about 70% by weight and about 80% by weight of the nonwoven composite material. The use of the secondary material within the fine fiber matrix creates a material having a fiber structure which is considerably more irregular and non-uniform as compared to microfiber meltblown fabrics more commonly utilized in filtration applications. Further, due to the more irregular internal structure of the composite material, relative to microfiber meltblown nonwoven webs, larger average pore structures are created. However, the composite material has a structure with less uniform fiber orientation and as a result has numerous tortuous paths through the fabric. This forces particles traveling through the composite material to flow in a multitude of directions which allows the filter to trap particles smaller than that of the complex pathway. As a specific example, the fine fiber nonwoven composite material can comprise a nonwoven web of polypropylene meltblown fibers and the secondary material can comprise generally ribbon-shaped pulp fibers having an average length between about 30μ and 50μ with an average height of about 5μ. Desirably, the nonwoven composite material has a mean pore size ranging from about 15μ to about 45μ and, still more desirably, a mean pore size of about 30μ. In a further aspect, the nonwoven composite material desirably has a wide range of pore sizes such as, for example, having pore sizes ranging from about 10μ to about 140μ. Despite having a mean flow pore size larger than many of the particles to be trapped, the complex and tortuous pathways through the composite material provide a filtration medium capable of efficiently entraping particles of a size from about 5μ to about 25μ. Moreover, such a structure also provides filtration media having good pressure drop as well as capacity and filter life.

The filtration media also has a first or upstream layer comprising a substantially uniform nonwoven web of continuous, bonded fibers. The first nonwoven web desirably has inter-fiber bonds throughout the web and an average pore size greater than that of the composite material. As used herein the term "substantially uniform" means a material which does not have regions of significantly high and low densities such as point bonded fabrics or other similar fabrics having high density and low density regions across the face or central portion of the fabric. Having relatively high-density areas, such as those created at bond points, generally decreases the filtration efficiency of the first nonwoven web and also increases the pressure drop across the filtration media. The substantially uniform, bonded nonwoven fabric can have inter-fiber bonds created by an external adhesive applied to the fibers or autogenous inter-fiber bonding. Desirably, the outer nonwoven web is directly attached to the composite material. However, other intermediate materials may be disposed therebetween.

An exemplary substantially uniform nonwoven material comprises autogenously bonded fibers and still more desirably comprises autogenously bonded multicomponent spunbond fibers. As used herein the term "multicomponent fibers" refers to fibers which have been formed from at least two polymers extruded from separate extruders but spun together to form one fiber. Bicomponent fibers refer to a common, specific class of multicomponent fiber wherein the fiber comprises two distinct components. The polymers are arranged in substantially constantly positioned distinct zones or segments across the cross-section of the fibers and extend continuously along the length of the fibers. The configuration of such fibers may be, for example, a sheath/core arrangement wherein one polymer is surrounded by another or may be a side-by-side arrangement, a pie arrangement or other arrangement. Multicomponent fibers are taught in U.S. Pat. No. 5,108,820 to Kaneko et al., U.S. Pat. No. 4,795,668 to Krueger et al., U.S. Pat. No. 5,336,552 to Strack et al. and in U.S. Pat. No. 5,382,400 to Pike et al.; the entire content of each of the aforesaid patents is incorporated herein by reference. For bicomponent fibers, the polymers are desirably present in ratios of 75/25, 50/50, 25/75 or any other desired ratios. The fibers may also have various shapes such as, for example, ribbon, hollow, multilobal and so forth. Desirably the autogenously bonded nonwoven web has a basis weight of at least 15 g/m$^2$ and desirably between about 30 g/m$^2$ to about 300 g/m$^2$ and even more desirably a basis weight between about 50 g/m$^2$ to about 150 g/m$^2$. Multiconstituent fibers capable of forming interfiber bonds are also believed suitable for use with the present invention. In a preferred embodiment, the autogenously bonded nonwoven web can comprise a multicomponent spunbond fiber web such as is described in U.S. Pat. No. 5,382,400 to Pike et al., U.S. Pat. No. 5,534,339 to Stokes and U.S. Pat. No. 5,855,784 to Pike et al.; the entire contents of the aforesaid patents are incorporated herein by reference. As a specific example, the autogenously bonded nonwoven web can comprise a high-loft web comprising crimped polyethylene/polypropylene conjugate fibers having a density between about 0.01 g/cm$^3$ and about 0.2 g/cm$^3$. As a further example, crimped polyethylene/nylon spunbond fiber webs are also believed well suited for use in the present invention.

Desirably, the substantially uniform nonwoven webs are autogenously bonded using hot air such as developed by "through-air bonding." As used herein, through-air bonding refers to a process of bonding nonwoven fiber webs in which hot air, that is sufficiently hot to melt one of the polymers comprising the fibers, is forced through the web. The hot air melts the lower melting polymer component and the resolidification of the melted polymer forms bonds between the filaments at contact points to integrate the web. As an example, an exemplary through-air bonding process suitable for use with the fabrics of the present invention can employ an air velocity between 100 and 500 feet per minute and dwell times up to about 6 seconds. Exemplary through-air bonding equipment can direct hot air, having a temperature above the melting temperature of one component and below the melting temperature of another component, from a surrounding hood, through the web, and into a perforated roller supporting the web. Alternatively, the through-air bonder may be a flat arrangement wherein the air is directed vertically downward onto the web. It will be appreciated by those skilled in the art that the requisite air temperature, air velocity and dwell time will vary with respect to the particular polymers comprising the nonwoven web, the composition or structure of the same as well as the degree of bonding desired.

The multilayer filtration media further comprises a second or downstream nonwoven web positioned such that the nonwoven composite web is disposed between the first and second nonwoven webs. Desirably, the second nonwoven layer comprises a material capable of providing additional filtration properties, strength and/or support to the nonwoven composite web. The second nonwoven web can comprise one or more of the materials discussed herein above with regard to the first outer nonwoven web. In one aspect of the invention, the second nonwoven web can comprise spunbond fibers comprising monocomponent, multiconstituent or multicomponent fibers. Desirably, the second nonwoven web likewise comprises a substantially uniform material. The particular polymer(s) or polymer blends used in the second nonwoven web can be selected to achieve the desired strength, abrasion resistance and/or other desired characteristics. The second or downstream nonwoven web desirably has a basis weight between about 15 $g/m^2$ and about 225 $g/m^2$ and still more desirably has a basis weight between about 30 $g/m^2$ and about 100 $g/m^2$. In one embodiment of the present invention, both the first and second nonwoven webs can comprise through-air bonded high-loft, multicomponent spunbond fiber webs. Further, it is desirable that the second nonwoven web likewise comprise a polymer having a softening and/or melting point which is the same as or substantially similar to the low melting component of the upstream or first nonwoven web so as to allow autogenous bonding of the entire laminate without the need for externally applied adhesive, point bonding and/or other additional means of attachment. However, where additional integrity is desired the multiple layers can be bonded as desired by one or more means known in the art such as use of an adhesive, mechanical crimping or stitching, thermal bonding, and/or ultrasonic bonding. The potential negative impact of adhesives or point bonding on filtration properties may be limited and/or eliminated by bonding only the edges of the multilayer filtration material.

Figure 3:
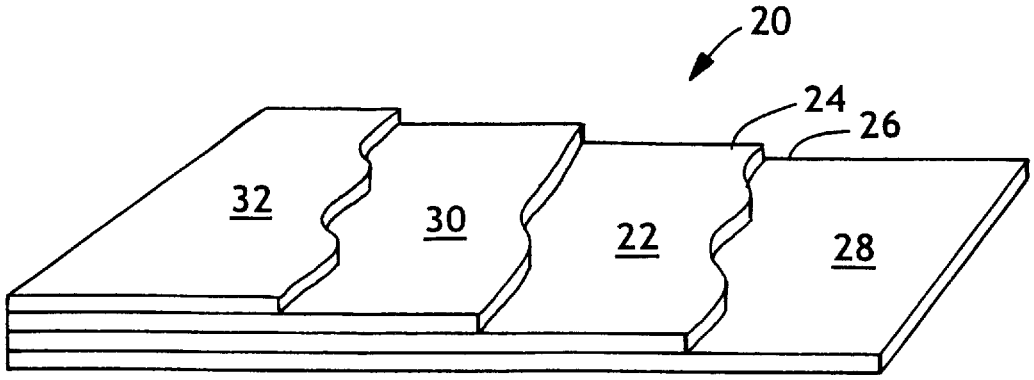
FIG. 3 is a partially elevated side view of a four layer filter material of the present invention shown partially broken away.

In a further aspect of the present invention, the upstream side of the filter media can comprise a plurality of substantially uniform and autogenously bonded layers. In reference to FIG. 3, the multilayer filter media 20 can comprise a nonwoven composite material 22 having first side 24 and second side 26. First autogenously bonded nonwoven web 30 can be attached to first side 24 of nonwoven composite material 22. Second autogenously bonded nonwoven web 28 can be attached to the second side 26 of nonwoven composite material 22. Third autogenously bonded nonwoven web 32 can be attached to the first autogenously bonded nonwoven web 30 thereby forming a four-layer laminate. Desirably, the first and third nonwoven webs 30 and 32 comprise fibers having at least one polymer having the same or substantially similar melting points. Still more desirably, the first and third autogenously bonded nonwoven webs 30 and 32 comprise the same materials. The first and third nonwoven webs 30 and 32 can have the same or different basis weights. Further, the first and third autogenously bonded nonwoven webs can comprise materials having the same or different pore structures. Desirably, the nonwoven fabric having a larger average pore size is preferably positioned upstream of the lower loft, lower density structure thereby allowing the layers to act as a depth filter and provide a filter medium having improved filter life and/or capacity. As a particular example, the first nonwoven web can comprise crimped polyethylene/polypropylene bicomponent spunbond fiber web having a density in the range between about 0.01 and 0.2 $g/cm^3$ and the third nonwoven web can comprise a crimped polyethylene/polypropylene bicomponent spunbond fiber web having a lower density than the first web. In one embodiment, the third layer can have a lower density by comprising a nonwoven web of spunbond fibers with a higher degree of crimp than that of the first nonwoven web.

Figure 4:
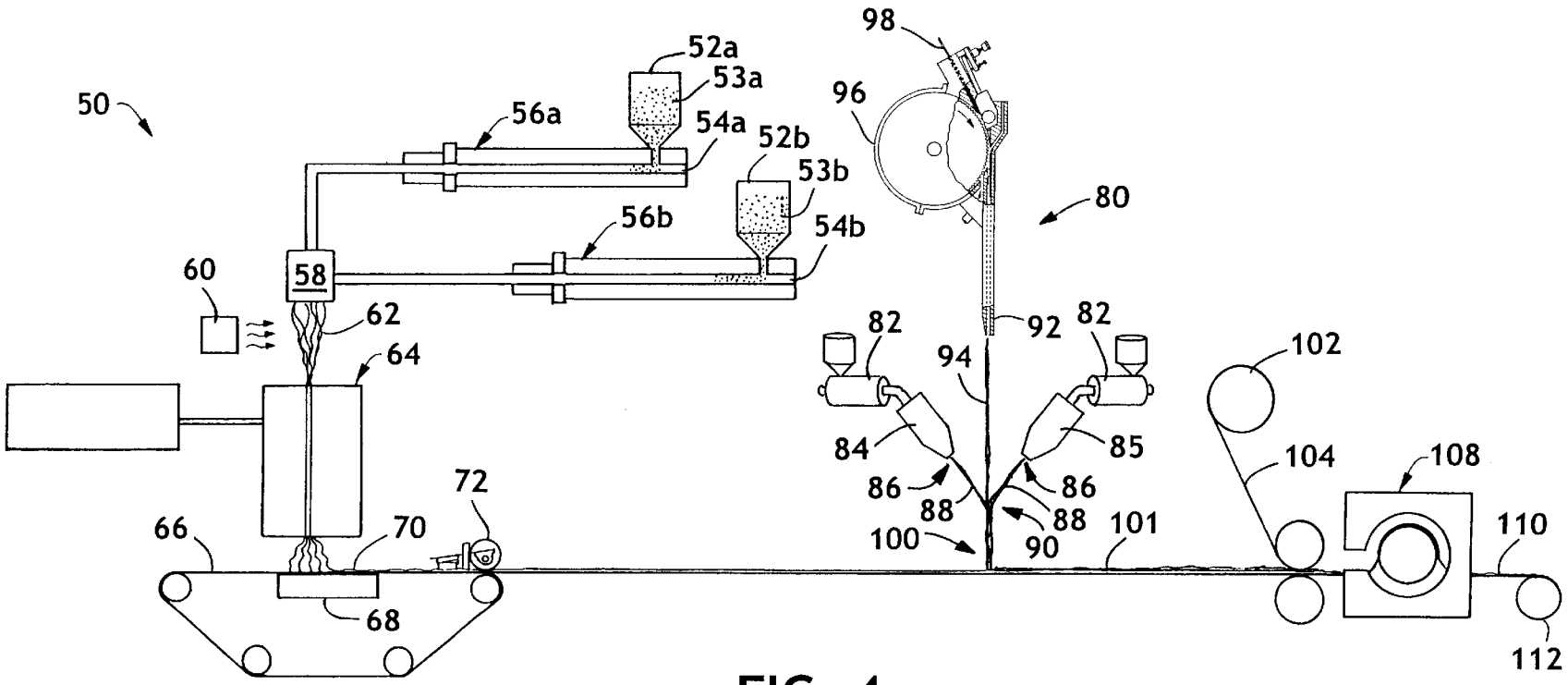
FIG. 4 is a schematic illustration of a method of making the nonwoven composite fabrics of the present invention.

In reference to FIG. 4, a process line 50 for fabricating a laminate of the present invention is disclosed. Hoppers 52*a* and 52*b* may be filled with the respective polymeric components 53*a* and 53*b*. The polymeric components are then melted and extruded by the respective extruders 54*a* and 54*b* through polymer conduits 56*a* and 56*b* and through spinneret 58. Spinnerets are well known to those skilled in the art and, generally, include a housing containing a spin pack which includes a plurality of plates stacked one on top of the another with a pattern of openings arranged to create the desired flow paths through the spinneret. As the extruded filaments extend below spinneret 58, a stream of air from quench blower 60 quenches bicomponent filaments 62. The filaments 62 are drawn into a fiber draw unit or aspirator 64 and then onto traveling foraminous surface 66, with the aid of vacuum 68, to form an unbonded layer of bicomponent spunbond fibers 70. The unbonded bicomponent fiber layer 70 may be lightly compressed by compression or compaction rollers 72. The bicomponent fiber layer can optionally be through-air bonded prior to formation of the composite nonwoven material. Those skilled in the art will appreciate that a bonded spunbond fiber web could be made previously and wound on a supply roll and fed into the present process.

Fine fiber composite material 101 can be made using the desired process equipment such as coform apparatus 80. Polymer is progressively heated to a molten state as it advances through extruder 82 and into meltblowing dies 84 and 85. Meltblowing dies 84 and 85 can be configured so that two streams of attenuating gas per die converge to form a single stream of gas which entrains and attenuates molten threads 88, as the threads 88 exit small holes or orifices 86 of the meltblowing dies 84 and 85. The molten threads 88 are attenuated into fibers and desirably, depending upon the degree of attenuation, microfibers. Thus, each meltblowing die 84 and 85 has a corresponding single stream of gas (not shown) containing entrained and attenuated polymer fibers. The gas streams containing polymer fibers are aligned to converge at an impingement zone 90.

One or more types of secondary fibers 92 and/or particulates are added to the two streams of thermoplastic polymer fibers or microfibers at the impingement zone 90. Introduction of the secondary fibers 92 into the two streams of thermoplastic polymer fibers 88 is designed to produce a graduated distribution of secondary fibers 92 within the combined streams of thermoplastic polymer fibers. This may be accomplished by merging a secondary gas stream containing the secondary fibers 92 between the two streams of thermoplastic polymer fibers 88 so that all three gas streams converge in a controlled manner.

Apparatus for accomplishing this merger may include a conventional picker roll assembly 96 which has a plurality of teeth that are adapted to separate a mat or batt 98 of secondary fibers into the individual secondary fibers 92. The mat or batt 98 of secondary fibers which is fed to the picker roll 96 may be a sheet of pulp fibers (if a two-component mixture of thermoplastic polymer fibers and secondary pulp fibers is desired), a mat of staple fibers (if a two-component mixture of thermoplastic polymer fibers and a secondary staple fibers is desired) or both a sheet of pulp fibers and a mat of staple fibers (if a three-component mixture of thermoplastic polymer fibers, secondary staple fibers and secondary pulp fibers is desired). FIG. 4 further illustrates that the secondary gas stream 94 carrying the secondary fibers 92 is directed between the streams of thermoplastic polymer fibers 88 so that the streams contact at the impingement zone 90. Due to the fact that the thermoplastic polymer fibers 88 are usually still semi-molten and tacky at the time of incorporation of the secondary fibers 92 into the thermoplastic polymer fiber streams, the secondary fibers 92 are usually not only mechanically entangled within the matrix formed by the thermoplastic polymer fibers 88 but are also thermally bonded or joined to the thermoplastic polymer fibers 88. The merged stream 100 of thermoplastic polymer fibers and secondary fibers are collected to form a coherent matrix of fibers, which is nonwoven composite web 101, on the surface of the spunbond fibers 70. Vacuum boxes (not shown) can assist in retention and/or formation of the matrix on the surface of the spunbond fibers. Alternately, a collecting device can be located in the path of the composite stream and the nonwoven composite web fed onto the multicomponent spunbond fiber material.

A second nonwoven web 104, such as an autogenously bonded bicomponent spunbond fiber web, can be unwound from a supply roll 102 and fed over the nonwoven composite web 101. The three layers can then, while in a face-to-face relation, be fed through through-air bonder 108 thereby bonding the respective layers to form an integrated, autogenously bonded three layer laminate 110. The laminate 110 can be wound on winder roll 112 or further processed and/or converted in-line as desired.

The method set forth above, for making a laminate of the present invention, can be modified in one or more ways as desired. As an example, the entire laminate can be made in-line, replacing the unwind 102 with a second spunbond forming apparatus. Additionally, to achieve the desired basis weights or web characteristics it may likewise be desirable to employ a series of spunbond or coform forming apparatus. Still further, each of the individual layers can be made off-line and unwound in series, and bonded together to form the filter media. However, typically the coform material lacks sufficient integrity to be wound/unwound without the use of a carrier sheet such as, for example, a lightweight spunbond sheet. Carrier sheets often have basis weights between about 10 g/m$^2$ and 16 g/m$^2$. Further, adhesive can be applied to one or more of the materials in order to increase the peel strength of the multilayer laminate. Still further, additional materials can be added to the multilayer laminate in order to further improve the strength, abrasion resistance or other properties of the multilayer laminate as desired.

Figure 5:
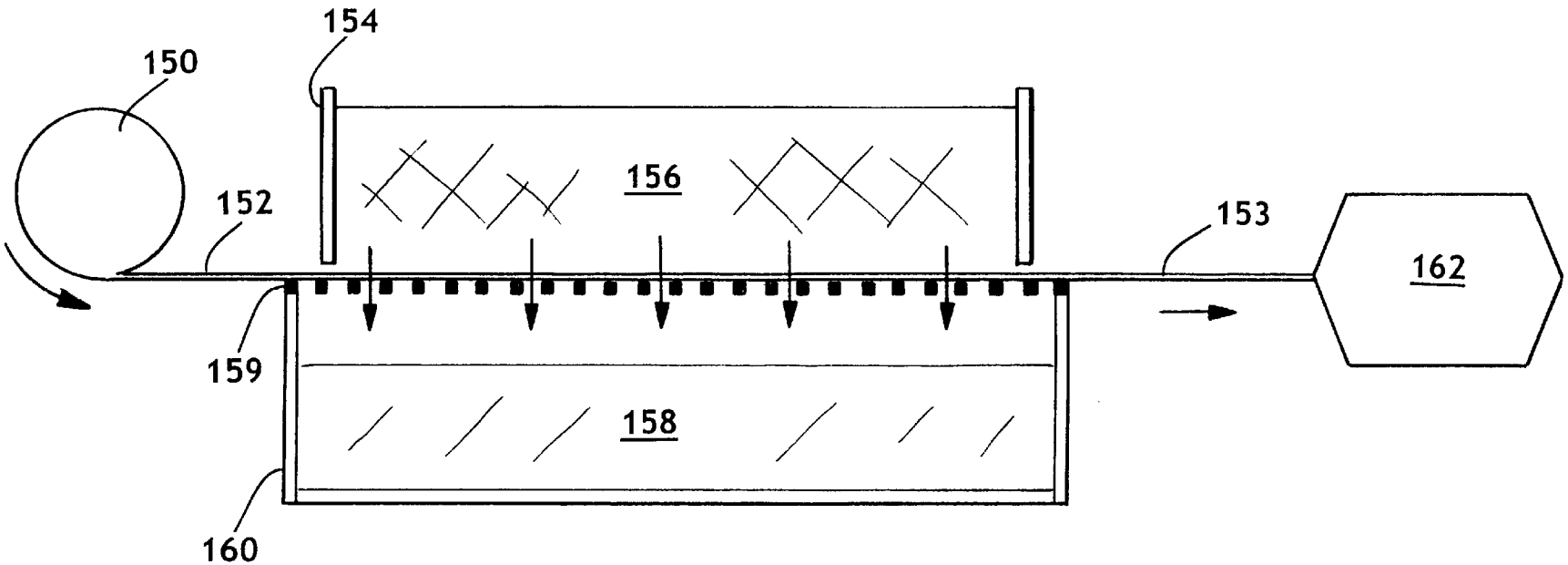
FIG. 5 is a schematic illustration of a process of filtering liquids containing particulate matter.

The filtration media of the present invention can have a variety of uses. The filter media can be converted as desired for use with a support member or within a filter element such as, for example, filter cartridges, frames, wire mesh, screen supports and so forth. As specific examples thereof the fabric can be used in filtration systems associated with metal working, auto grinding, aluminum rolling, sewage or waste water treatment and so forth. In reference to FIG. 5, filtration media 152 can be unwound from supply roll 150 and travels in the direction of the arrow associated therewith. Container 154 holds contaminated liquid 156 having particulate matter therein. Contaminated liquid 156 is drawn through filtration media 152 thereby producing filtered liquid 158 that is collected in second container 160. The liquid flows through the filter media in the direction of the arrows associated therewith. Filtration media 152 can be supported on an open or foraminous surface 159 such as, for example, a mesh screen, a series of pinner bars, or another substantially open structure. As filtration media 152 filters particulate matter within contaminated liquid 156 the filter media eventually becomes saturated forming spent filter medium 153. The spent filtration medium 153 can be fed to a waste disposal apparatus 162 and/or recycling apparatus. The filtration media 152 is desirably cycled through the filtration system such that filter medium is at least substantially saturated at or fully saturated at or near the end of the filtering window. In this regard, contaminated liquid 156 can be drawn through filter medium 152 with the aid of a vacuum (not shown) and, as the filtration medium becomes more highly saturated, the pressure drop across the fabric increases. When a particular pressure drop is reached the filtration medium can be cycled through the filtration zone or window. Additionally and/or alternatively, the filtration medium can simply be cycled through the filtration window at a predetermined rate, e.g. at a constant rate or at set intervals. Desirably, the filtration media has a filtration efficiency of at least 50% for particles ranging in size from about 5$\mu$ to about 25$\mu$.

EXAMPLE 1

A 51 g/m$^2$ nonwoven web of crimped bicomponent spunbond fibers is formed in accord with U.S. Pat. No. 5,382,400 to Pike et al. The bicomponent spunbond fibers comprise 50/50 components of polypropylene (Exxon Chemical Co. polypropylene 3155) and polyethylene (Dow Chemical Co. polyethylene 6811) having a side-by-side configuration. The bicomponent spunbond fiber webs are through-air bonded to form an autogenously bonded nonwoven web having interfiber bonds dispersed throughout the web. The autogenously bonded bicomponent spunbond fiber web is then slit to the desired width and wound onto a winder roll. The autogenously bonded spunbond fiber web is subsequently unwound from the winder roll and fed onto a foraminous surface. A coform material is formed directly upon the surface of the autogenously bonded spunbond fiber web forming a two-layer spunbond/coform material which is then wound on a winder roll. The 90 g/m$^2$ coform material is made in accord with U.S. Pat. No. 4,100,324 to Anderson et al. The meltblown fibers comprise polypropylene (Montell North America polypropylene PF015) and the secondary fibers comprise a fluff pulp (Georgia Pacific fluff pulp RM 4821) with the fluff pulp comprising about 60%, by weight, of the coform. The two-layer spunbond/coform material is subsequently unwound from the winder roll and fed onto a foraminous surface. Bicomponent spunbond fibers, the same as those described above with regard to the 51 g/m$^2$ spunbond fiber web, are formed directly upon the coform layer of the spunbond/coform material. The three layers are then passed through a through-air bonder thereby forming a cohesive three-layer laminate.

While various patents and other reference materials have been incorporated herein by reference, to the extent there is any inconsistency between incorporated material and that of the written specification, the written specification shall control. In addition, while the invention has been described in detail with respect to specific embodiments thereof, it will be apparent to those skilled in the art that various alterations, modifications and other changes may be made to the invention without departing from the spirit and scope of the present invention. It is therefore intended that the appended claims cover all such modifications, alterations and other changes.

What is claimed is:

1. Filtration media consisting essentially of:

a nonwoven composite material having a first and second side and comprising a stabilized matrix of thermoplastic microfibers having within said microfiber matrix at least about 50%, by weight, of a secondary material;

a first nonwoven web adjacent said first side of said nonwoven composite material wherein said first nonwoven web comprises a substantially uniform nowoven web having inter-fiber bonds throughout the web; and a second nonwoven web adjacent said second side of said nonwoven composite material and wherein said first and second nonwoven webs and said nonwoven composite material comprise an integrated autogenously bonded multilayer laminate.

2. The filtration media of claim 1 wherein said nonwoven composite material has a basis weight between about 30 $g/m^2$ and about 300 $g/m^2$.

3. The filtration media of claim 2 wherein said secondary material of the nonwoven composite material comprises a fibrous material selected from pulp, polymeric staple fibers, and feathers.

4. The filtration media of claim 2 wherein said secondary material of the nonwoven composite material comprises a fibrous, non-polymeric material.

5. The filtration media of claim 4 wherein said secondary material of the nonwoven composite material comprises pulp.

6. The filtration media of claim 3 wherein said first nonwoven web comprises a nonwoven web of continuous fibers selected from the group consisting of multicomponent and multiconstituent fibers.

7. The filtration media of claim 6 wherein said first nonwoven web comprises an autogenously bonded web of crimped multicomponent spunbond fibers having a density between about 0.01 $g/cm^3$ and about 0.2 $g/cm^3$.

8. The filtration media of claim 7 wherein said first nonwoven web of multicomponent spunbond fibers comprises a web of polyethylene/polypropylene bicomponent spunbond fibers.

9. The filtration media of claim 8 wherein said second nonwoven web comprises a nonwoven web of continuous fibers selected from the group consisting of multicomponent and multiconstituent fibers.

10. The filtration media of claim 8 wherein said composite material comprises meltblown fibers having an average fiber size less than about 15$\mu$.

11. The filtration media of claim 9 wherein said second nonwoven web comprises a substantially uniform, autogenously bonded nonwoven web of crimped multicomponent spunbond fibers and further wherein said fibers of said second nonwoven web comprise polyethylene and a second polymer.

12. The filtration media of claim 11 wherein said first autogenously bonded nonwoven web has a basis weight between about 30 $g/m^2$ and 150 $g/m^2$, and said second nonwoven web has a basis weight of between about 30 $g/m^2$ and 150 $g/m^2$.

13. The filtration media of claim 7 further comprising a third nonwoven web wherein said third nonwoven web comprises a substantially uniform and autogenously bonded nonwoven web of crimped multicomponent spunbond fibers and further wherein said third nonwoven web has a density greater than the density of said first nonwoven web.

14. The filtration media of claim 13 wherein said nonwoven composite material has a basis weight between about 50 $g/m^2$ and 300 $g/m^2$, said first and third nonwoven webs have a combined basis weight between about 50 $g/m^2$ and 150 $g/m^2$, and said second nonwoven web a basis weight of between about 30 $g/m^2$ and 150 $g/m^2$.

* * * * *